Patented Dec. 2, 1947

2,432,016

UNITED STATES PATENT OFFICE 2,432,016

2-SUBSTITUTED FURAN-3,4-DICARBOXYLIC ACIDS, THEIR CORRESPONDING SATURATED ANALOGUES AND DERIVATIVES THEREOF

Klaus Hofmann, Summit, N. J., assignor to Ciba Pharmaceutical Products, Incorporated, Summit, N. J., a corporation of New Jersey No Drawing. Application November 24, 1943, Serial No. 511,610

6 Claims. (Cl. 260—345)

The present application is in part a continuation of copending application, Serial No. 459,674, filed on September 25, 1942, and the invention to which the present application relates is a further development of the invention described and claimed in said copending application.

A principal object of this invention is the preparation of new and useful derivatives of the 2-substituted furan-3,4-dicarboxylic acids of the general formula I 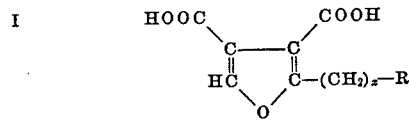

and of the corresponding tetrahydro-dicarboxylic acids of the formula

Ia 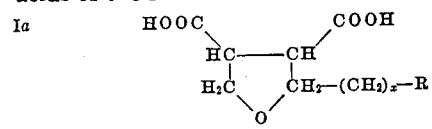

with especial reference to those situations wherein R represents a —CH₂OH group and $x$ represents the integer 4.

A still further object of the invention is to develop synthetic procedures useful in the preparation of biotin analogues.

According to the present invention, the aforedescribed furan derivatives may be prepared by reacting a 2-substituted furan derivative II with an acetylene-dicarboxylic acid ester to produce the complex intermediate III, which is then partially hydrogenated with the aid of a suitable catalyst to form the compound IV. The latter, on distillation, loses one molecule of ethylene, and forms the corresponding 2-substituted furan-dicarboxylic ester V which, by catalytic hydrogenation, may be converted into the corresponding saturated analogue VI. Treatment of the reduction products with hydrazine hydrate results in the production of a mixture of stereoisomeric hydrazides VII.

This phase of the procedure may be exemplified by the following scheme:

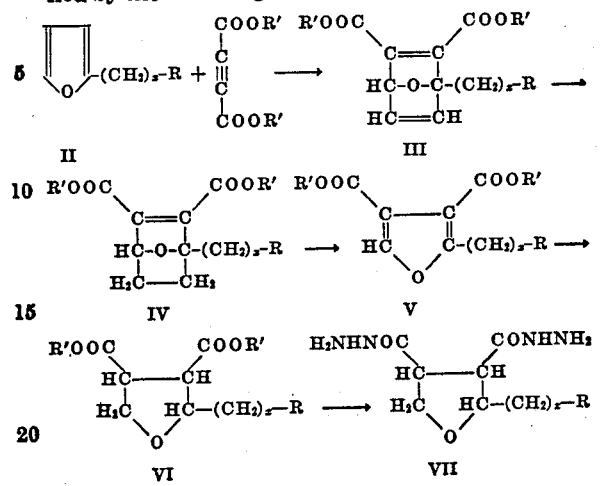

The hydrazides VII may then be converted, through the intermediate azides VIII, into the corresponding isomeric 3,4-diaminocarbethoxy derivatives IX. These may be subjected to hydrolysis to produce the corresponding isomeric diamino compound X which may conveniently be isolated in salt form, e. g., as the sulfuric acid salt. This phase of the procedure may be exemplified by the following scheme:

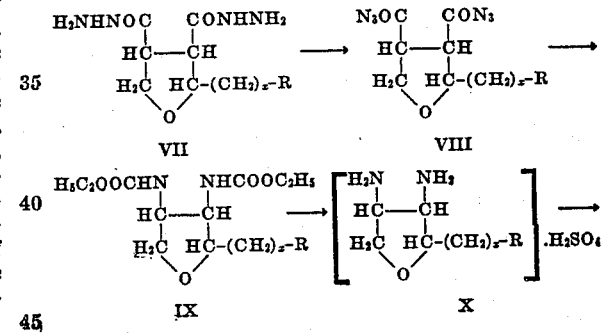

An important refinement of the invention, particularly with respect to this phase thereof, is the step of converting the —CH₂OH group at the end of the aliphatic side chain (R in the starting materials representing the primary alcohol group) to a carboxyl group by oxidation, for example with chromic acid in glacial acetic acid, prior to effecting the hydrolysis from stage IX to stage X, thus:

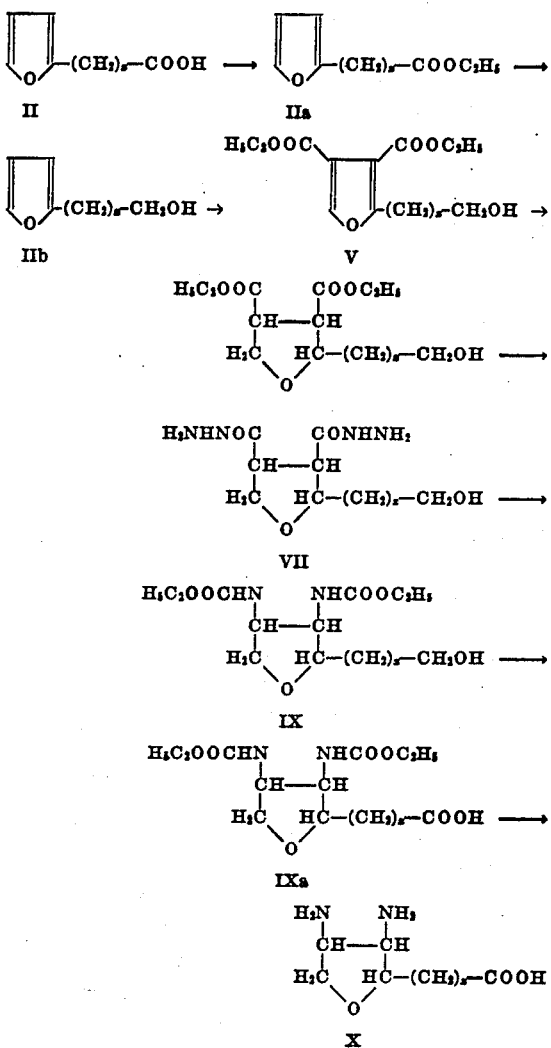

The transition from IIb to V is through the corresponding stages III and IV, as shown in the first scheme, supra. The transition from VII to IX is through the corresponding 3,4-diazide (VIII).

Suitable starting materials are the 2-substituted furans of the general formula II wherein R stands for a carboxyl group or a group, preferably —CH₂OH, which can be transformed into a carboxyl group, and $x$ stands for one of the numbers 2, 3, 4, etc.

Among the groups which can be transformed to a carboxyl group the following ones may be mentioned: aliphatic and aromatic esters such as methyl, ethyl, propyl, phenyl, benzyl esters; aliphatic and aromatic amides such as amide, mono- and dimethyl amide, diethyl amide, piperidide, anilide, N-methylanilide; nitrile; hydroxyl; halogen; aldehyde and derivatives thereof such as acetal.

Esters of the acetylene-dicarboxylic acid which may be used in the reaction are, for example methyl, ethyl, propyl, isopropyl, phenyl, benzyl esters.

For the partial reduction of the intermediate of the Formula III the following catalysts may for example be used: metals of the platinum group such as platinum, palladium or others as such or on carriers, or nickel in the various forms used for such purpose. The catalytic reduction of the furan ring to the corresponding saturated compounds may be carried out under pressure and at temperatures between 20° to 250° C. with catalysts, as for example nickel in neutral solution or a metal of the platinum group in acid solution.

The new compounds are useful for the preparation of substances which are valuable for therapeutic purposes or as intermediates in the production of such substances.

The following examples illustrate methods of carrying out the present invention, but it is to be understood that the examples are given by way of illustration and not of limitation.

*Example 1*

1.2 g. of furyl-(2)-n-valeric acid ethyl ester were mixed with 980 mg. of acetylene-dicarboxylic acid-diethyl ester and the mixture was heated on the steam bath for 18 hours, after which time the mixture was taken up in 10 cc. of ethyl acetate and was hydrogenated in the presence of palladium black until 1 molecule of hydrogen has been absorbed.

The catalyst was then separated from the solution and the ethyl acetate was evaporated in vacuum, leaving a viscous oil which was distilled in vacuum. The fraction boiling between 165–168° C. at 0.01 mm. pressure was collected and represents the triethyl ester of furan-3,4-dicarboxy-(2)-n-valeric acid. When the ester is treated with alkali the free tricarboxylic acid is obtained. M. P. 188–189° C.

The tricarboxylic acid was suspended in water and enough 2N KOH was added to make the solution pink to phenolphthalein. Raney nickel was added to the solution and it was hydrogenated at 2400 pounds and 150° C. for 5 hours. The solution was then acidified to Congo red, was evaporated to dryness in vacuo and the organic material was extracted with ethyl acetate. The extracted acids were esterified in the usual manner and the methyl ester was distilled and the tetrahydro-3,4-dicarb-methoxy-furan-(2)-n-valeric acid methyl ester was obtained.

*Example 1a*

46.7 g. of furyl-(2)-n-valeric acid were dissolved in 500 cc. of 4% absolute alcoholic HCl and the solution was kept at room temperature for 12 hours. The solution was then concentrated to a small volume in vacuo and the ester was isolated in the usual manner. The ester was obtained as a colorless liquid which boiled at 130–133° C. at 16 mm.

*Example 2a*

10 g. of the above ethylester of furyl-(2)-n-valeric acid were dissolved in 100 cc. of absolute alcohol and this solution was rapidly added to 30 g. of sodium. 200 cc. of absolute alcohol were gradually added and the mixture was heated on the steam bath until all of the sodium was dissolved. The solution was cooled and the sodium ethylate was decomposed by the addition of 100 cc. of water. The strongly alkaline solution was refluxed for an additional hour and the alcohol was removed by steam distillation. The aqueous residue was extracted with ether, the ethereal solution was washed with water, dried over sodium sulfate and the ether was removed on the steambath. The residual viscous oil was then distilled in vacuo and yielded furyl-(2)-n-pentanol boiling at 125–130° C. at 16 mm.

*Example 2*

2 g. of furyl-(2)-n-valeric acid were mixed with 2 g. of acetylene-dicarboxylic acid-diethyl ester and the mixture was heated to 90° C. for 6 hours. The reaction product was dissolved in 20 cc. of ethyl acetate and was then hydrogenated in the presence of palladium on calcium carbonate catalyst and was distilled in vacuum. The fraction boiling at 203–204° C. 0.04 mm. pressure corresponds to furan - 3,4 - dicarboxy - ethyl-(2)-n-valeric acid. Saponification of this ester yields the tricarboxylic acid M. P. 188–189° C., identical with the acid as obtained in Example 1.

*Example 3*

A solution of 2.35 g. of furyl-(2)-n-valeric acid piperidide and 1.42 g. of acetylene-dicarboxylic acid-dimethyl ester were boiled for 10 hours in 50 cc. of dry benzene. The benzene was then evaporated in vacuum and the viscous residue dissolved in 20 cc. of methanol and hydrogenated in the presence of Raney nickel catalyst until one molecule of hydrogen had been absorbed. The solution was then separated from the catalyst by filtration, concentrated to dryness and the residue was distilled in vacuum. The distillate was dissolved in a mixture of 5 cc. of methanol and 3 cc. of 5/N aqueous KOH, and the solution was refluxed for 2 hours. The methanol was removed in vacuo and the residue was acidified to Congo red. The furan - 3,4 - dicarboxy -(2)- n - valeric acid piperidide separated out, which melted after recrystallization at 131° C. This material was hydrolized by boiling it 6 hours with 50 cc. of a mixture of 50% glacial acetic acid and 50% concentrated hydrochloric acid. The residue after evaporation of the acetic acid hydrochloric acid mixture melted at 188–189° C. and was identical with the material obtained according to Examples 1 and 2.

4 grams of 3,4 - dicarbethoxy - furan -(2)- n - valeric acid piperidide were dissolved in 40 cc. of ethyl alcohol and were hydrogenated in the presence of nickel on kieselguhr catalyst at 150° C. and 2500 pounds pressure. The catalyst was then removed by filtration and the 3,4-dicarbethoxy-tetrahydrofuran -(2)- n - valeric acid piperidide was distilled in vacuum.

*Example 4*

1.98 g. of furyl-(2)-n-valeraldehyde-dimethyl acetal were heated in a sealed tube with 1.42 g. of acetylene-dicarboxylic acid-dimethyl ester for 10 hours to 90–100° C. The viscous oil was then dissolved in 20 cc. of ethyl alcohol and was hydrogenated in the presence of platinum black catalyst. The hydrogenation came to an end when the amount of hydrogen, corresponding to one double bond, had been taken up. The solution was then separated from the catalyst and was evaporated in vacuo. The residue was distilled in vacuo to decompose the complex and the distillate was dissolved in a mixture of 20 cc. of methanol and 20 cc. of 5N NaOH and kept at 20° C. for 48 hours. The methanol was then distilled off and the remaining aqueous solution was acidified to Congo red and heated on the steam bath for 2 hours. The 3,4-dicarboxy-furyl-(2)-n-valeraldehyde was extracted with ether and was oxidized with freshly prepared silver oxide in alkali solution. The tricarboxylic acid obtained melted at 188–189° C. and was identical with the substance obtained according to Example 1.

*Example 5*

1.54 g. of furyl-(2)-n-butyric acid and 1.70 g. of acetylene-dicarboxylic acid-diethyl ester were dissolved in 20 c.. of toluene and the solution was refluxed for 5 hours. The toluene was then removed and the residue was hydrogenated in ethylalcohol solution in the presence of palladium on barium-sulfate catalyst. The catalyst was then removed and the alcohol was evaporated in vacuo. The residue was distilled in vacuo, whereby the addition compound was decomposed and 3,4-dicarbethoxy-furan-(2)-n-butyric acid was obtained. Saponification of the ester yielded 3,4-dicarboxy-furan-(2)-n-butyric acid.

*Example 6*

A mixture of 30.8 g. of furyl-(2)-n-pentanol and 37.6 g. of diethyl acetylene dicarboxylate were heated on the steam bath for 6 hours and the resulting viscous addition compound was dissolved in 200 cc. of ethyl acetate and was hydrogenated in the presence of a palladium catalyst until 5.7 liters of hydrogen had been absorbed. The catalyst was removed by filtration and the partially hydrogenated material was decomposed into ethylene and 3,4-dicarbethoxy-furan-(2)-n-pentanol which was purified by distillation. B. P. 174–175° C. at 0.01 mm.

*Example 7*

1.5 g. of the above 3,4-dicarbethoxy-furan-(2)-n-pentanol were refluxed for 2 hours with 4 cc. of 5NKOH and 8 cc. of methanol. The solution was then concentrated to a small volume in vacuo and acidified to Congo red with concentrated HCl. The resultant crude 3,4-dicarboxy-furan-(2)-n-pentanol was purified by crystallization from ethyl acetate and melted at 124–126° C.

*Example 8*

1 g. of the above 3,4-dicarboxy-furan-(2)-n-pentanol was dissolved in 10 cc. of glacial acetic acid, and 42 cc. of a 2% solution of chromic acid in glacial acetic acid were slowly added. The solution was kept at room temperature for 12 hours and the excess of chromic acid was destroyed by the addition of 5 cc. of methanol. The solvents were removed in vacuo and the dark green residue was dissolved in water and extracted with ethyl acetate. The ethyl acetate extracts were washed with water, dried over sodium sulfate and concentrated to a small volume on the steam bath. 3,4-dicarboxy-furan-(2)-n-valeric acid melting at 188–190° C. identical with the substance described in Example 1 was obtained.

*Example 9*

31 g. of 3,4-dicarbethoxy-furan-(2)-n-valeric acid ethyl ester were dissolved in 100 cc. of grain alcohol and were hydrogenated in a steel bomb in the presence of a nickel-on-kieselguhr catalyst at an initial pressure of 1900 pounds and a temperature of 170–180° C. for 3 hours. The catalyst was removed by filtration and the alcohol was removed in vacuo. The oily residue was dissolved in ether, was washed with 2N sodium carbonate and water and dried over sodium sulfate.

The ether was removed on the steam bath and the residue was distilled in vacuo. The hydrogenated esters boiled at 162–168° C. at 0.01 mm. and had the following constants:

$$d^{23}=1.094 \quad n_D^{24}=1.4579$$

Example 10

20 g. of 3,4-dicarbethoxy-furan-(2)-n-pentanol were dissolved in 200 cc. of grain alcohol and were hydrogenated in the presence of a Raney nickel catalyst at an initial pressure of 1900 pounds and a temperature of 170–180° C. for 3 hours. The hydrogenated esters were isolated as described in Example 9 and they had the following constants:

B. P. 175–180° C. at 0.02 mm.
$$d^{21}=1.102 \quad n_D^{24}=1.4660$$

Example 11

15 g. of the hydrogenated esters, prepared according to Example 10, were refluxed for 5 hours with 15 g. of hydrazine hydrate and the solution was kept in the refrigerator for a few hours. The solid mass of hydrazides was collected and washed with absolute alcohol and dried over concentrated sulfuric acid. Three isomeric hydrazides A, B and C of the empirical composition $C_{11}H_{22}O_4N_4$ could be separated from the crude reaction product by fractional crystallization from dilute ethanol.

Example 12

500 mg. of the above hydrazide A were dissolved in 10 cc. of 1N hydrochloric acid and the solution was cooled to 0° C. 3 cc. of a 10% solution of sodium nitrite were slowly added with vigorous stirring and stirring was continued for an additional 10 minutes. The azide was extracted with ice-cold ether and the ether extracts were washed with 10% sodium-hydrogen carbonate and water, and dried over sodium sulfate. 20 cc. of absolute ethanol were then added, the ether was removed and the residual alcoholic solution was refluxed for 1 hour. The alcohol was removed and a crystalline 3,4-diaminocarbethoxy-tetrahydrofuran-(2)-n-pentanol was obtained. Degradation of the isomeric hydrazides B and C resulted in the formation of two additional isomeric 3,4-diaminocarbethoxytetrahydrofuran-(2)-n-pentanols.

Example 13

Each of the three isomeric urethanes described above was oxidized as follows: 477 mg. of the material were dissolved in 5 cc. of glacial acetic acid and 14.4 cc. of a 2% solution of chromic acid in glacial acetic acid were slowly added. The solution was kept at room temperature for 12 hours and the excess of chromic acid was destroyed by the addition of 2 cc. of methanol. The solution was evaporated to dryness in vacuo and the dark green residue was dissolved in water and was extracted with ethyl acetate. The ethyl acetate-soluble parts were separated into acid and neutral substances with 2N sodium carbonate in the usual manner. From the respective acid fractions three isomeric 3,4-diaminocarbethoxytetrahydrofuran-(2)-n-valeric acids were obtained.

Example 14

The above three isomeric 3,4-diaminocarbethoxytetrahydrofuran-(2)-n-valeric acids were hydrolyzed as follows: 213 mg. of the respective urethane were heated to 110° C. in a sealed tube with 1.2 g. of Ba(OH)$_2$.8H$_2$O and 10 cc. of water for three hours. The excess of baryta was then removed with CO$_2$ and the barium carbonate was filtered off. The clear filtrate was acidified to Congo red with 10% sulfuric acid, the precipitate of barium sulfate was removed and the filtrate was concentrated to a small volume in vacuo. Addition of methanol resulted in the precipitation of the respective 3,4-diaminotetrahydrofuran-(2)-n-valeric acid sulfate.

I claim:

1. The 2-substituted furan 3,4-diamino compounds of the formula

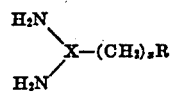

wherein X is a nucleus of the group consisting of the furan and tetrahydrofuran nuclei, the NH$_2$ groups being attached in the 3,4-positions of the said nucleus and the —(CH$_2$)$_x$R group being attached in the 2-position of the said nucleus, $x$ being one of the integers 2, 3, and 4, R being a member of the group consisting of carboxyl and a group convertible to carboxyl.

2. The 2-substituted furan compounds of the formula

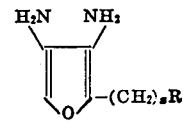

wherein R is a member of the group consisting of carboxyl and a group convertible to carboxyl, and $x$ representing one of the integers 2, 3, and 4.

3. The 2-substituted tetrahydrofuran compounds of the formula

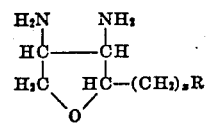

wherein R is a member of the group consisting of carboxyl and a group convertible to carboxyl, and $x$ representing one of the integers 2, 3 and 4.

4. A 3,4-diaminotetrahydrofuran-(2)-n-valeric acid of the formula

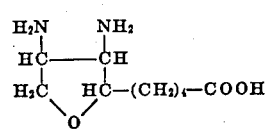

5. In a process for the manufacture of a biotin analogue, the steps of subjecting a compound of the formula

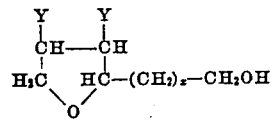

wherein Y is a group which is hydrolyzable to amino and $x$ is one of the integers 2, 3 and 4, to oxidation to convert the primary alcohol group to a carboxyl group, and then subjecting the resultant product to hydrolysis.

6. In a process for the manufacture of a biotin analogue, the steps of subjecting a urethane of the formula

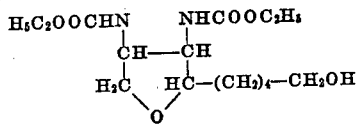

to oxidation by means of chromic acid in glacial acetic acid to produce the corresponding urethane of tetrahydrofuran-(2)-n-valeric acid, and then subjecting the latter to hydrolysis with the aid of barium hydroxide to produce the corresponding 3,4-diamino-tetrahydrofuran-(2)-n-valeric acid.

KLAUS HOFMANN.

REFERENCES CITED

The following references are of record in the file of this patent:

UNITED STATES PATENTS

| Number | Name | Date |
| --- | --- | --- |
| 2,005,538 | Engelmann | June 18, 1935 |
| 2,231,787 | Adams et al. | Feb. 11, 1941 |
| 2,317,286 | Martin et al. | Apr. 20, 1943 |